United States Patent
Bartlow et al.

Patent Number: 5,462,191
Date of Patent: Oct. 31, 1995

[54] DOUBLE-WALLED UNDERGROUND STORAGE TANK

[75] Inventors: David H. Bartlow; Edward B. Cannan, Jr., both of Conroe, Tex.

[73] Assignee: Fluid Containment, Inc., Conroe, Tex.

[21] Appl. No.: 192,268

[22] Filed: Feb. 7, 1994

[51] Int. Cl.⁶ .................................................. B65D 90/04
[52] U.S. Cl. ...................... 220/469; 220/455; 220/454; 220/645
[58] Field of Search ........................ 220/469, 645, 220/651, 565, 468, 654, 454, 455, 456, 457, 453

[56] References Cited

U.S. PATENT DOCUMENTS

| | | |
|---|---|---|
| Re. 34,203 | 3/1993 | Palazzo . |
| 3,335,904 | 8/1967 | Anderson .................. 220/645 |
| 3,394,841 | 7/1968 | Anderson .................. 220/645 |
| 3,661,294 | 5/1972 | Pearson .................... 220/645 |
| 4,640,439 | 2/1987 | Palazzo . |
| 4,644,627 | 2/1987 | Palazzo . |
| 4,653,312 | 3/1987 | Sharp . |
| 4,655,367 | 4/1987 | Palazzo . |
| 4,780,946 | 11/1988 | Palazzo . |
| 4,780,947 | 11/1988 | Palazzo . |
| 4,923,081 | 5/1990 | Weaver et al. ............. 220/645 |
| 4,927,050 | 5/1990 | Palazzo . |
| 5,045,263 | 9/1991 | Palazzo . |
| 5,115,936 | 5/1992 | Bartlow . |
| 5,129,540 | 7/1992 | Palazzo . |
| 5,143,244 | 9/1992 | Kauffman .................. 220/645 |
| 5,224,621 | 7/1993 | Cannan, Jr. et al. . |
| 5,232,119 | 8/1993 | Kauffman .................. 220/469 |
| 5,259,895 | 11/1993 | Sharp ....................... 220/469 |

*Primary Examiner*—Stephen J. Castellano
*Attorney, Agent, or Firm*—Brooks & Kushman

[57] ABSTRACT

A double-walled fiberglass reinforced resin underground storage tank including a generally cylindrical inner wall having a plurality of circumferential support ribs bonded thereto, at least one spacer filament mounted on the outer surface of the inner wall of the tank over a substantial portion of the length of the tank, and an outer wall substantially conforming to the contour of the inner wall and the support ribs but not adhered to the inner wall or the support ribs. The outer wall cures into relatively tight conformance with the inner wall and support ribs resulting in a reduced annular space between the walls. Small voids are created immediately adjacent to the spacer filaments, providing fluid passageways which enhance the otherwise slow migration of fluid in the annular space.

9 Claims, 3 Drawing Sheets

DOUBLE-WALLED UNDERGROUND STORAGE TANK

TECHNICAL FIELD

This invention relates to underground storage tanks suitable for storing liquids and having secondary containment.

BACKGROUND ART

Underground liquid storage tanks are often used to store corrosive and/or environmentally hazardous liquids such as gasoline. These tanks have typically been fabricated from steel or fiberglass reinforced plastic resin ("FRP"). In recent years, double-walled tanks have been developed which provide an annular space between an inside wall and an outside wall for secondary containment of any leakage, either from outside the tank into the tank due to a break in the outer wall, or from inside the tank out of the tank due to a break in the inner wall. It is well known that the annular space can be filled with a leak detecting fluid which can then be monitored to detect the occurrence of a leak in the tank's inner or outer wall ("hydrostatic" or "wet" systems). Alternatively, the annular space between the walls can be left empty and provided with a liquid detector suitable for detecting liquid leakage ("dry systems").

Two important considerations in developing improved double-walled storage tank manufacturing methods and designs are (1) reducing the cost of manufacturing the tanks, and (2) providing a design which allows for rapid transmission of leaking liquid into and through the annular space.

One prior proven double-walled tank design, disclosed in U.S. Pat. No. 4,923,081, issued to Weaver et al., comprised generally parallel inner and outer tank walls separated by the inner wall's circumferential support ribs. While this design was adequate, fabrication, particularly fabrication of the outer wall, was relatively time-consuming and costly. In addition, this design required a relatively thick outer wall since the outer wall was not buttressed by support ribs. Also, significantly more detecting fluid was required to fill the larger annular space in wet systems.

One obvious design improvement was an outer wall which followed the profile of the support ribs and inner wall, thereby reducing the volume of the annular space (and thereby the cost of detecting liquid required to fill the annular space). Double-walled tanks incorporating this improved feature were contemplated, and even patented. However, no automated, cost-effective fabrication method was developed to create the outer wall which conforms generally to the profile of the inner wall and support rib until Owens-Corning Fiberglass Corporation developed a method and apparatus for compressing the laid-up outer wall layers into the space between the support ribs as the outer wall layers were applied. This improved fabrication method (disclosed hereinafter in greater detail) resulted in the commercialization of the double-walled tank design disclosed in U.S. Pat. No. 5,155,936, issued to Bartlow.

As illustrated by the Bartlow patent, it is known to interpose a plastic mesh spacer material between the inner and outer walls of a tank between the support ribs to define the annular space. Bartlow also discloses the connection of the annular space with the hollow space inside the support ribs to allow for communication of leak detecting fluid and/or leaking liquid from the annular space to the interior of the ribs.

Thus, previous double-walled tank designs included spacer material to define an annular space adequate for rapid transmission of leaking liquid into and through the annular space, and therefore relatively rapid detection of leaks. However, the annular space, particularly where such space communicated with the hollow support ribs, was still sufficiently large that a significant volume of leak detecting fluid was required in order to fill the space. It was thus desirable to develop a double-walled tank design which further reduced the size of the annular space.

One obvious way of further reducing the annular space was to eliminate the spacing material between the inner and outer walls. Each of U.S. Pat. Nos. 4,653,312; issued to Bruce R. Sharp, and Re. 34,203; issued to David T. Palazzo, disclose double-walled storage tanks wherein the outer wall is fabricated directly over the inner tank after the inner tank has been coated only with a release agent. These proposed designs rely upon capillary action for the migration of liquid in the extremely small annular space between the inner and outer walls of the tank. And, while such migration does occur, it is extremely slow, resulting in the problem of long-delayed detection of fluid which has leaked into the annular space. Another problem with the proposed designs is the inordinate time required for filling the annular space with leak detecting liquid for those double-walled tanks which utilize hydrostatic systems.

Thus, while the prior art evidences the obvious evolution of double-walled tank design towards continuing reduction of the annular space between the inner and outer walls, no one has yet disclosed a commercially practical design and method for making a fiberglass reinforced resin double-walled storage tank that does not require spacing material between the walls for commercially feasible fabrication, installation, and leak detection.

DISCLOSURE OF THE INVENTION

One object of the present invention is, therefore, to provide a fiberglass reinforced resin double-walled storage tank including circumferential support ribs and an annular space between the walls, but without the spacing material utilized in existing commercial tanks.

Another object of the present invention is to provide a double-walled storage tank which has a smaller annular space between the inner and outer walls and, therefore, requires less leak detection liquid therein, but at the same time includes means for providing for rapid enough migration of liquids in the annular space to enable efficient and economical installation of the leak detecting liquid prior to installation.

Another object of the present invention is to provide a double-walled storage tank with a reduced annular space, but with means for providing quicker detection of leaks than would be achieved through migration of the liquid by mere capillary action.

According to the present invention, there is provided a double-walled fiberglass reinforced resin underground storage tank including a generally cylindrical inner wall having a plurality of circumferential support ribs bonded thereto, at least one spacer filament mounted on the outer surface of the inner wall of the tank over a substantial portion of the length of the tank, and an outer wall substantially conforming to the contour of the inner wall and the support ribs, but not adhered to the inner wall or support ribs. Though the outer wall tends to shrink fit into relatively tight conformance with the inner wall and support ribs as it cures, small voids are created immediately adjacent to the spacer filaments, providing fluid passageways which enhance the otherwise slow migration of fluid in the annular space.

The tank is typically constructed from two substantially identical cylindrical halves which are separately formed and then integrally joined or welded as described hereinafter. After a single-walled tank half, including circumferential support ribs, has been constructed, one or more spacer filaments are placed on the outer surface of the tank, preferably extending in the longitudinal direction for substantially the entire length of the tank. After the spacer filaments are placed on the outer surface of the tank, the filaments are covered with a sheet material such as a solid separating film or masking tape. This covering forms tangent surfaces on either side of the filament, extending from the top of the filament to the outer surface of the inner wall, defining voids between the outer surface of the inner .wall, the spacer filament, and the covering. The outer surface of the tank, the support ribs and the covered spacer filaments are then coated with a separating film or release agent. The outer wall is then laid-up or sprayed-up directly over the inner wall, support ribs and covered filaments in substantial conformance with the surface profile of the inner wall and support ribs.

In one embodiment of the invention, a solid stretchable film is wrapped as a continuous sheet around the outer surface of the inner wall and support ribs of the tank as the tank and mandrel are rotated about the longitudinal axis of the tank to create a gas impervious layer which prevents adhesion between the inner wall and the outer wall when the outer wall is laid-up or sprayed-up over the inner wall on the mandrel. As described above, before the stretchable film is wrapped around the outside of the inner wall, a plurality of spacer filaments are applied to the outer surface of the inner wall, with each of the filaments preferably parallel to the others and extending in the longitudinal direction of the tank for substantially the entire length of the tank. In this embodiment, the stretchable film serves the dual function of preventing adhesion of the outer wall to the inner wall and support ribs, as well as covering the spacer filaments to define the passageways prior to lay-up of the upper wall over the covered filaments. The solid stretchable film conforms to the shape of the contoured surface of the sidewalls and support ribs as the solid film is wrapped around the tank. One type of material which may be used as the solid stretchable film is polyvinyl alcohol ("PVA").

In one particular embodiment, each of four relatively equally spaced apart spacer filaments are threaded through holes in the sidewalls of the hollow support ribs so that the interior portions of the ribs are in communication with the annular space and leaking fluid, or leak detecting fluid, flows freely from the annular space to the interior of the ribs.

The double-walled storage tank of this invention has several advantages over existing double-walled tanks. Elimination of spacer materials, such as commonly used plastic mesh, eliminates both the cost of the material as well as the manufacturing time and expense associated with cutting and laying up the mesh sheets on the outer surface of the inner wall of the tank between the support ribs. Conforming the outer wall as nearly as possible to the shape of the inner wall and the support ribs minimizes the size of the annular space and, therefore, reduces the volume of detecting liquid required to fill the annular space. Applying filament(s) along the outer surface of the inner wall, and in particular threading the filament(s) through holes in the sidewalls of the hollow support ribs, allows for effective communication of leaking liquid through the reduced annular space, thereby allowing for reduced assembly time associated with filling the annular space and hollow support ribs with detecting liquid, and, subsequently, more rapid detection of leaks than would otherwise be obtainable by mere capillary action of the liquid in the reduced space between the walls.

BEST MODE FOR CARRYING OUT THE INVENTION

Figure 1:
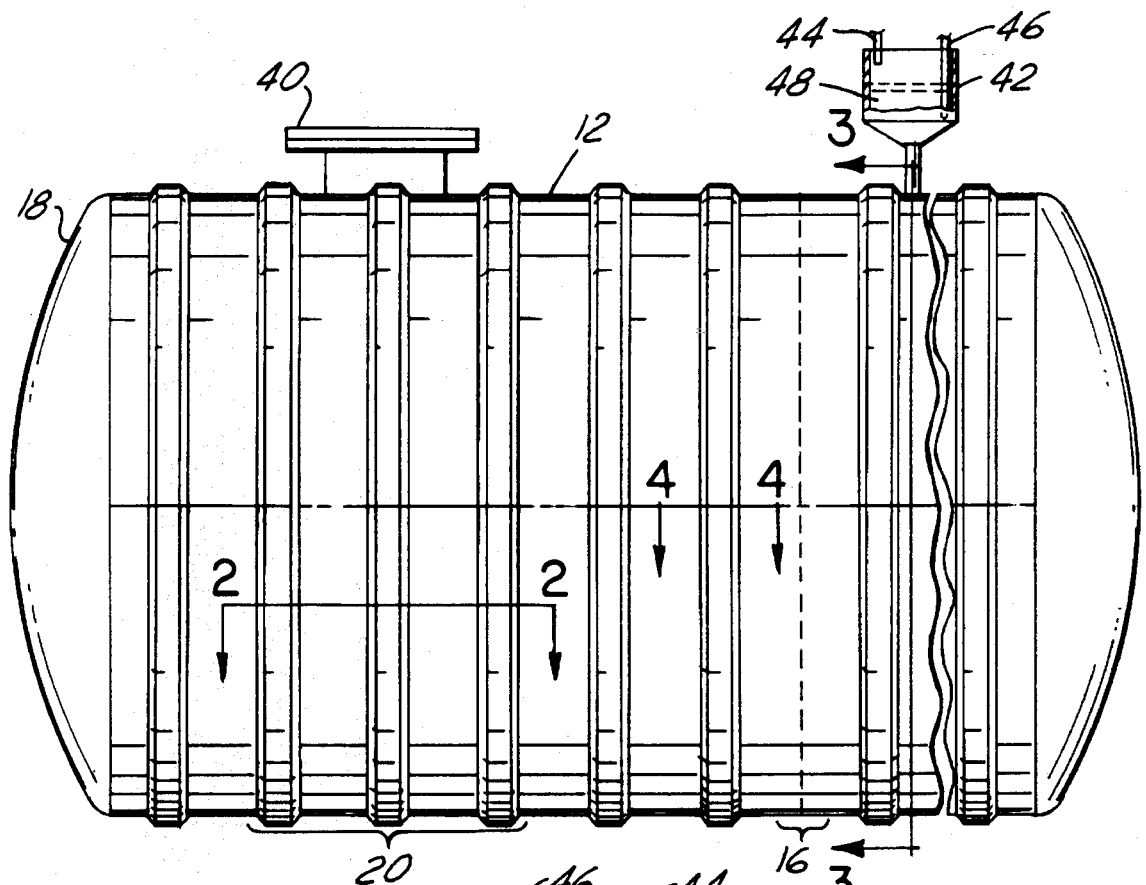
FIG. 1 is an elevational view of a double-walled underground storage tank constructed in accordance with the present invention.

Referring to FIG. 1, the double-walled storage tank 10 of the present invention is comprised of two opposed generally frustoconical tank halves 12 and 14 connected together at a center joint 16. Each of the tank halves 12, 14 includes an end cap 18 and generally cylindrical sidewalls 20 which include a plurality of spaced apart support ribs 22 surrounding the tank and extending along the longitudinal axis thereof. The cylindrical sidewalls 20 and end caps 18 each comprise fiber reinforced plastic resin. The support ribs also include fiber reinforced resin fabricated on a hollow plastic or cardboard rib form 25 secured to the exterior of the inner wall with resilient netting and thread. The ribs may be fabricated in the manner disclosed in U.S. Pat. No. 4,923,081, which also discloses the procedure for constructing the inner tank. U.S. Pat. No. 4,923,081 is incorporated herein for its teachings regarding the known manner of fabricating the inner tank and support ribs.

Figure 2:
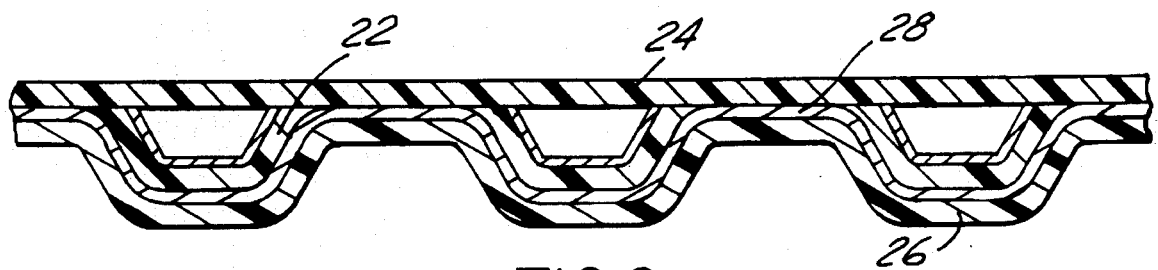
FIG. 2 is a cross-sectional view of three of the ribs and the inner and outer tank walls taken generally along lines 2—2 of FIG. 1.

As shown in FIG. 2, the sidewalls include an inner wall 24 and an outer wall 26. The support ribs 22 are mounted upon, and bonded to, the outer surface of the inner wall 24 of the tank. The outer wall 26 is fabricated over the support ribs 22 and inner wall 24 in general conformance with the shape of the support ribs and inner wall. Prior to fabrication of the outer wall 26, however, a separator layer 28 is applied over substantially the entire outer surface of the inner wall 24 and support ribs 22 to prevent adhesion of the outer wall 26 to the inner wall 24 and support ribs 22. It will be appreciated that, although the separator layer 28 is shown in relatively enlarged cross section in the figures, this layer 28 may be substantially thinner in cross section (on the order of 0.0003–0.001 inches), since the separator layer 28 need only be sufficient to prevent adhesion between the inner wall 24 and the outer wall 26. In this manner, an annular space is created between the inner wall 24 and the support ribs 22, and the outer wall 26. This annular space provides secondary containment of any liquids which may leak from inside the tank 10 through the inner wall 24, or conversely, any liquid leaking into the tank through the outer wall 26.

Figure 5:
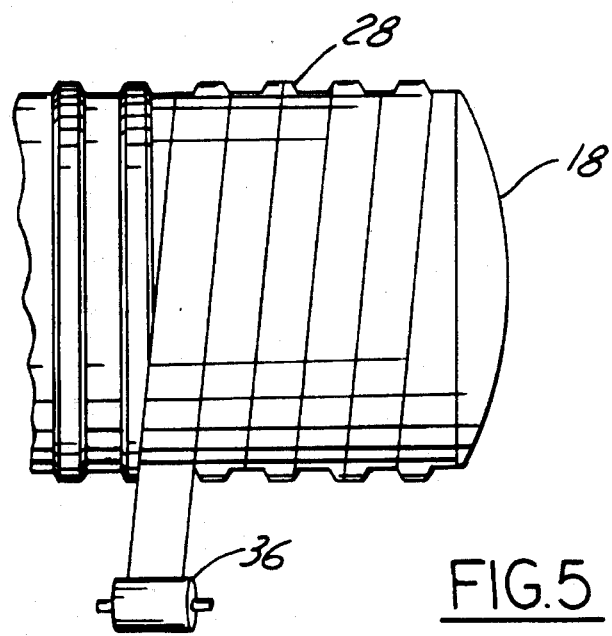
FIG. 5 is a schematic illustration showing the application of a stretchable PVA film to the outside of the inner wall of a storage tank during fabrication thereof.

The separator layer 28 may be any substance or material suitable for preventing adhesion of the hardenable liquid resin, fiber, and other constituents of the outer wall to the inner wall during fabrication of the outer wall atop the inner wall and support ribs. As previously described, the separator material is preferably a solid stretchable film, such as PVA, which conforms to the contoured surface of the inner wall and support ribs as it is wrapped around the tank in the manner disclosed hereafter (and as shown in FIG. 5) by winding the stretchable PVA film material around the inner wall and support ribs to create a non-stick surface over which the outer wall is then fabricated. Another separating material sufficient for preventing adhesion is a non-stretchable film, such as Mylar. Mylar may be employed as hereinafter described by wrapping it over the outer surface of the inner wall in sections between the support ribs. The use of the stretchable film (wrapped over the entire inner tank side walls and support ribs) or the non-stretchable section film (wrapped over the inner tank side walls between the ribs) provides the dual function of preventing adhesion of the constituents of the outer wall to the inner wall over the wrapped areas as well as covering the spacer filaments to define the passageways adjacent the spacer filaments.

Another substance which may be applied to the outer surface of the inner wall is any of a number of commercially available liquid film formers or release agents (such as for example PVA dissolved in a conventional solvent, or a wax, or Partall®). As will be described more fully hereinafter, where a liquid film former is used as the separator material on the side walls of the inner tank, a separate cover is first applied over the spacer filaments to define the passageways adjacent the Spacer filament and under the covering. For example, masking tape can be placed over the spacer filaments for this purpose. The separator material 28 can also be applied in liquid form to the surface of the inner tank end caps 18 by spraying, brushing or rolling the separator material onto the surface.

Figure 3:
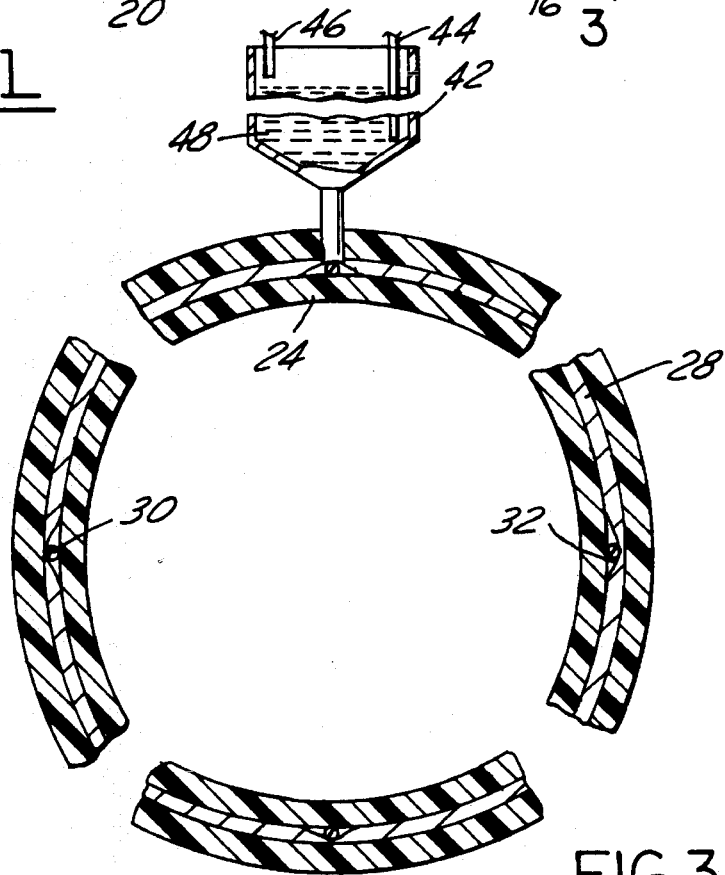
FIG. 3 is a fragmentary cross-sectional view of the inner and outer tank walls taken generally along lines 3—3 of FIG. 1.
Figure 4:
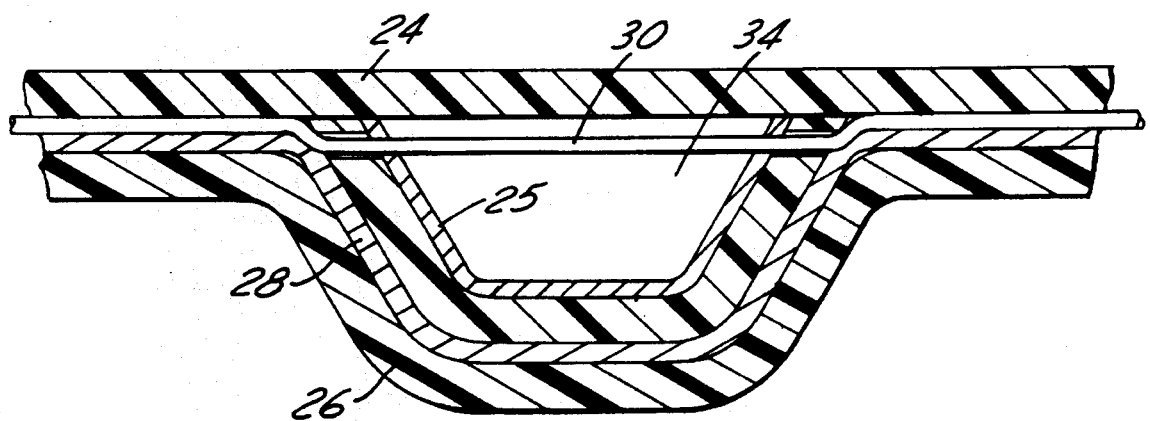
FIG. 4 is a cross-sectional view of a rib taken generally along lines 4—4 of FIG. 1.

Referring to FIGS. 3 and 4, one or more filaments are positioned on the outer surface of the tank inner wall 24, prior to application of the separator material 28. The outer wall 26 is then fabricated over the inner wall 24, support ribs 22, spacer filament, and separator material in conformance with the profile of the support ribs and inner wall. The outer wall also conforms generally to the contour of the covered spacer filaments 30. However, small open areas, or voids 32, are created immediately adjacent the spacer filaments. These voids provide a passageway for liquid in the annular space, thereby enabling rapid detection of leaks. The filaments are typically made of a foam-oriented polypropylene material (FOPP), available from Engineered Monofilaments, Williston, Vt. The filament may vary in diameter from less than 0.008 inches to ½ inch, and is preferably about 0.08 inches in diameter.

In one embodiment, filaments are positioned longitudinally for substantially the entire length of the tank at 0 degrees, 90 degrees, 180 degrees and 270 degrees about the circumference of the tank. The filaments preferably extend through openings in each of the hollow support ribs so that the passageway formed by the voids adjacent the filaments allow for passage of liquid in the annular space between the inner wall 24 and outer wall 26 to and through the space 34 inside the hollow ribs 22. The cross-sectional area of each of the voids is preferably within the range of from about 0.0020 square inches to about 0.0001 square inches. Most preferably, the cross-sectional area of each void is about 0.0005 square inches.

As previously described, double-walled tanks can be designed either for a wet or dry annular space. When the tank is designed for a wet annular space, the space is filled with a leak detecting liquid, such as water or liquid antifreeze. In this liquid leak detecting system, the annular space is preferably connected to a reservoir (shown as 42 in FIG. 1) which includes commercially available sensing means (shown as 44, 46 in FIG. 1) such as for sensing changes in the volume of liquid contained in the annular space, which volume change would result from a leak in either the inner or outer tank walls.

If the tank is designed with a dry leak detection system, the bottom of the tank is typically adapted, in a known manner, with one or more liquid sensors, preferably mounted within a hollow rib (not shown) at the bottom of the tank. If desired, a flow channel, such as is disclosed in U.S. Pat. 5,224,621, issued to Cannan, Jr., et al., can be provided for enabling more rapid flow of leaking liquid from one end of the tank to the other along the bottom of the tank.

It will be appreciated by those skilled in the art that other methods of molding passageways in the annular space between the inner and outer walls of the tank may be employed. However, the use of a limited number of relatively small monofilaments, each extending substantially along the entire length of the tank through the hollow support ribs, provides adequate passageways for liquid in the annular space with limited material cost and without significant increase in the volume of the annular space.

Construction of the Tank

As previously described, the inner wall and support ribs of the tank can be constructed in a manner substantially as disclosed in U.S. Pat. No. 4,923,081, which is herein incorporated by reference. After the inner wall and support rib have substantially cured, the sidewalls and support ribs are then covered with a separator material 28. Due to the structural support provided by the ribs, the inner wall is laid-up to a thickness of between one-tenth and four-tenths inches, depending on the diameter of the tank. This design is also adequate to support the external load caused by liquid entering the annular space from, for example, outside the outer wall of the tank, without collapsing.

After the inner wall and support ribs of the tank are constructed, one or more spacer filaments are mounted on the sidewalls. As previously described, the filaments preferably extend through openings in each of the hollow support ribs so that the passageway formed by the voids adjacent the filaments allow for communication of any liquids between the annular space between the inner wall 24 and the outer wall 26 and through the space 34 inside the hollow ribs 22. In one embodiment, the spacer filaments are positioned in the longitudinal direction along substantially the entire length of the tank, with the filament threaded through suitably drilled holes in the sidewalls of the hollow ribs.

In an alternative method, the spacer filaments can be mounted on the sidewalls of the outer surface of the inner tank prior to construction of the support ribs on the tank. If this procedure is utilized, the rib form for the support ribs will be placed over the spacer filaments on the tank and the support rib subsequently fabricated thereon. In this manner, voids adjacent the spacer filaments underneath the rib form define passageways which allow for communication of liquids between the annular space and space inside the support ribs.

If the separator material 28 is applied as a solid stretchable PVA film to the sidewalls, the film is preferably wrapped on the rotating mandrel including the inner walls and support ribs from a roll 36 which is supported on a carrier which, in turn, is supported for movement along a path parallel to the axis of the mandrel. As with the tank fabrication apparatus described in U.S. Pat. No. 4,923,081, indexing means are provided for controlling the movement and position of the carriage upon which the roll 36 is supported to control the movement and position of the carriage, and therefore the roll, relative to the mandrel. It will thus be appreciated that as the carriage is indexed for movement along the entire length of the rotating mandrel, the separator film 28 may be wrapped about the sidewalls, including inner wall and support ribs. Since the PVA film is stretchable, it conforms to the contoured surface of the sidewalls and support ribs. As previously described, a liquid film former is preferably applied to the end caps 18 (by spraying, brushing or rolling) to prevent adhesion of the to-be-formed outer wall to the inner wall. It will also be appreciated that the stretch wrapping of PVA film over the filament on the sidewalls helps define the voids adjacent the filament, since the PVA film tends to lay over the filament like a tent.

Figure 6:
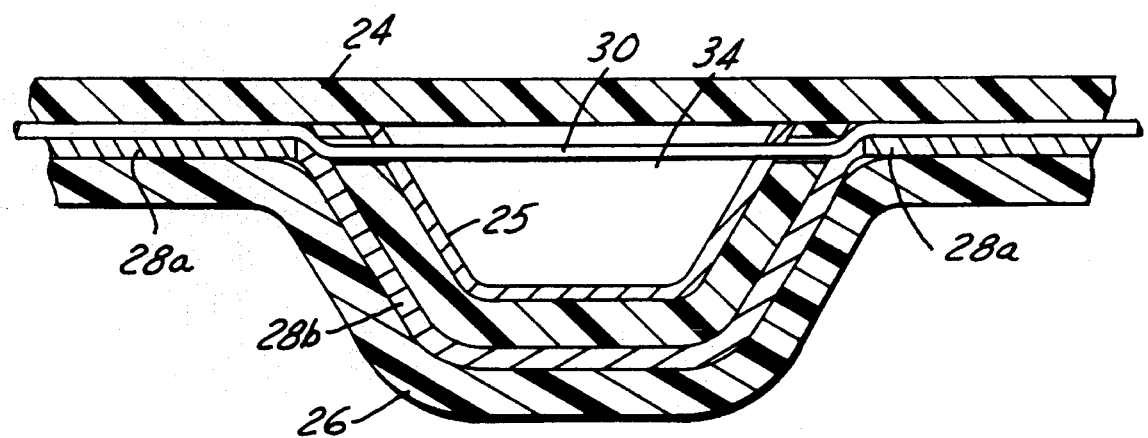
FIG. 6 is a cross-sectional view of a rib of an alternative embodiment of the present invention taken generally along lines 4—4 FIG. 1.

In an alternative method of applying the separator material 28, as shown in FIG. 6, solid non-stretchable film such as Mylar sheets 24a, may be utilized to cover the sidewalls of the inner tank between the ribs. The protruding support ribs may then be separately coated with a liquid film former 28b, so that the combined Mylar film sheets and liquid film former serve to prevent adhesion of the inner tank sidewalls and support ribs, respectively, to the outer wall as it is formed over the inner tank.

In another alternative method, each of the spacer filaments can be covered with a sheet material, such as masking tape. This covering, along with the spacer filament, will define the voids adjacent the filament in a manner similar to the solid separator film described above. A liquid film former may then be applied over the entire tank (including the sidewalls, the support ribs, the covered spacer filaments, and the end caps of the tank) to prevent adhesion of the subsequently applied outer wall.

Whether applied as a solid film or as a liquid film former or as a combination of both, the resulting separator film 28 is typically between 0.00033 inches and 0.001 inches thick. In the preferred embodiment, 0.0008 inch thick solid stretchable PVA film is used.

Next, the outer wall is formed over the inner wall, support ribs, separator and filaments by application of a desired number of layers, each including a surface mat, hardenable liquid resin, and chopped glass in the same sequence as described for fabrication of the inner wall in U.S. Pat. No. 4,923,081. However, in contrast to the method of fabricating the parallel outer wall that is separated by the height of the support ribs from the inner wall as described in U.S. Pat. No. 4,923,081, each outer wall layer is pressed against the top of the support ribs and the outer surface of the inner wall between the support ribs after it is laid up by winding a roll of resilient nylon netting, preferably about 4 inches in width, over the immediately preceding mat/resin/glass layer around the spinning mandrel. This netting is applied in the same manner, and with the same apparatus, described herein in connection with application of the separator film.

As it cures, the outer wall shrinks to a tight fit over the surface of the inner wall and support ribs, thereby reducing the annular space between the inner and outer walls to approximately the thickness of the separator film, except where the passageways are created by the voids adjacent the filaments as previously described. It will be appreciated that, except for the passageways created by the spacer filaments, the reduced annular space between unbonded inner and outer walls is adequate so long as the separation of the walls is sufficient to allow migration of leaking liquids, or leak detecting liquids to the passageways from elsewhere in the annular space, whether by capillary action or other means.

The outer wall is typically less than two-tenths of an inch thick, with a preferred thickness of about 0.187 inches.

Upon completion of the outer wall, two double-walled tank halves are united to form a tank 10. One of the tank halves is preferably provided with a manway (shown as 40 in FIG. 1) to allow for completion of the process of joining the inner walls of the two tank halves. The tank also can be fitted with suitable other known fixtures, such as a reservoir 42 and sensors 44 and 46 for a wet leakage detection system. Following completion of the fabrication of the tank 10, the tank is preferably tested for leaks using the well known soap bubble test. Then, for wet systems, the annular space, and preferably the hollow space under each of the support ribs, is filled with the detecting liquid 48, preferably prior to shipment of the tank to the installation site.

The use of filaments to create the fluid passageways in the otherwise minuscule annular space between the inner and outer walls of the tank enhances the liquid flow in the annular space significantly. For example, the entire annular space and hollow ribs may be filled with leak detecting liquid (amounting to approximately 100 gallons of liquid for a 10,000 gallon capacity tank) within a few hours. Similarly, detection of leaks in the tank of the present invention occurs within a few days. Thus, the method and apparatus of the present invention provides a double-walled storage tank with the structural advantages of currently commercially available double-walled tanks, at a lower manufacturing cost, since the material cost has been reduced by elimination of the open mesh spacing material and reduction in the amount of detection liquid required to fill the smaller annular space, and due to the increased speed of manufacturing.

While the best mode for carrying out the invention has been described in detail, those familiar with the art to which this invention relates will recognize various alternative designs and embodiments for practicing the invention as disclosed by the following claims.

What is claimed is:

1. An underground storage tank comprising:
   a generally cylindrical inner wall comprising plastic resin and reinforcement fibers;
   a plurality of circumferential support ribs bonded to the outer surface of the inner wall;
   a generally cylindrical outer wall comprising plastic resin and reinforcement fibers, the outer wall substantially conforming to the contour of the inner wall and the support ribs;
   at least one spacer filament mounted on the outer surface of the inner wall in the longitudinal direction over a substantial portion of the length of the tank, separating the inner wall from the outer wall and providing voids defining a passageway in which liquid flow is enhanced; and
   a separator film interposed between the inner wall, spacer filament, and support ribs, and the outer wall, and covering substantially the entire outer surface of the inner wall, spacer filament, and support ribs to prevent adhesion of the outer wall to the inner wall and support ribs.

2. The tank of claim 1 including at least four spacer filaments, each extending longitudinally along substantially the entire length of the tank and wherein each of the spacer filaments are generally equally spaced apart about the circumference of the tank.

3. The tank of claim 1 wherein the separator film includes a continuous sheet of solid stretchable film wrapped helically in a continuous, overlapping manner along the entire length of the outer surface of the inner wall, the support ribs, and the spacer filaments.

4. The tank of claim 3 wherein the separator film is solid polyvinyl alcohol film.

5. The tank of claim 1 wherein the separator film includes:
   a plurality of solid film sheets extending over the outer surface of the inner wall between the circumferential support ribs, and
   a coating of liquid film former covering the circumferential support ribs, whereby the solid film sheets and liquid film former together cover substantially the entire outer surface of the inner wall and support ribs.

6. The tank of claim 1 further including sheet material covering the spacer filaments, and wherein the separator film is a liquid film former.

7. The tank of claim 1 wherein at least one of the support ribs is hollow and each hollow support rib includes an opening for communicating liquid between the hollow space inside the rib and the space between the inner wall and the outer wall.

8. The tank of claim 7 wherein at least one spacer filament extends through the opening in each hollow support rib into the hollow space inside the rib.

9. An underground storage tank comprising:

a generally cylindrical inner wall comprising plastic resin and reinforcement fibers;

a plurality of hollow circumferential support ribs bonded to the outer surface of the inner wall, each hollow support rib including an opening for communicating liquid between the hollow space inside the rib and outside the rib;

a generally cylindrical outer wall comprising plastic resin and reinforcement fibers, the outer wall substantially conforming to the contour of the inner wall and the support ribs;

four spacer filaments, each extending longitudinally along substantially the entire length of the tank, and each of the spacer filaments being generally equally spaced apart about the circumference of the tank, each spacer filament separating the inner wall from the outer wall and providing voids defining a passageway in which liquid flow is enhanced, each spacer filament extending through the holes in each of the hollow support ribs; and a separator film interposed between the inner wall, spacer filaments, and support .filaments, and support ribs, and the outer wall, and covering substantially the entire outer surface of the inner wall, spacer filaments, and support ribs, to prevent adhesion of the outer wall to the inner wall and support ribs.

\* \* \* \* \*